United States Patent
Denecheau et al.

(10) Patent No.: US 6,680,947 B1
(45) Date of Patent: Jan. 20, 2004

(54) AUTO ADAPTIVE LOAD BALANCING IN A CONNECTION ORIENTED DATA TRANSMISSION SYSTEM

(75) Inventors: Lionel Denecheau, Vence (FR); Jean Claude Dispensa, St Jeannet (FR); Denis Esteve, Vence (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,589

(22) Filed: Apr. 6, 2000

(30) Foreign Application Priority Data

Apr. 12, 1999 (EP) .............................................. 99480020

(51) Int. Cl.$^7$ ............................................. H04L 12/28
(52) U.S. Cl. .................... 370/396; 370/395.2; 370/401; 370/404; 709/105; 709/201
(58) Field of Search ................................ 370/217, 221, 370/222, 223, 225, 227, 228, 229, 230, 351, 396, 395.2, 395.53, 401, 403, 404, 405, 406, 450, 452, 460, 461, 462, 465; 709/105, 226, 227, 242, 249, 310, 201, 238, 239; 455/453

(56) References Cited

U.S. PATENT DOCUMENTS

| | | | | |
|---|---|---|---|---|
| 5,936,962 A | * | 8/1999 | Haddock et al. ............. | 370/446 |
| 6,421,317 B1 | * | 7/2002 | Denecheau et al. .......... | 370/222 |
| 6,438,133 B1 | * | 8/2002 | Ervin et al. ................. | 370/403 |
| 6,556,574 B1 | * | 4/2003 | Pearce et al. ................ | 370/401 |

FOREIGN PATENT DOCUMENTS

EP 0824293 2/1998

OTHER PUBLICATIONS

IBM Technical Disclosure Bulletin, vol. 38, No. 09, Sep. 1995, "Load Balancing for Multiple Interfaces for Transmission Control Protocol/Internet Protocol for VM/MVS", pp. 7–9.

* cited by examiner

*Primary Examiner*—Huy D. Vu
*Assistant Examiner*—Thomas E. Volper
(74) *Attorney, Agent, or Firm*—John B. Frisone; Joscelyn G. Cockburn

(57) ABSTRACT

Auto-adaptive method of load balancing in a data transmission system wherein one active station (32) amongst a plurality of stations requests the access to the resources of a host (10), the active station being connected to a connected-oriented network linked to host (10) by means of a plurality of communication controllers (12, 14, 16) identified by the station (32) with the address of host (10), the connected-oriented network implementing a protocol in which route discovery frames are sent from the station (32) to all the communication controllers (12, 14, 16) and response frames are sent back with a predefined delay from each one of the communication controllers to the station (32), whereby the station (32) selects the route defined by the first received response frame, this method being characterized in that the delay to apply to the response frame is at each moment dynamically defined by using a logarithmic function of the current number of active stations.

5 Claims, 3 Drawing Sheets

| NUMBER OF ACTIVE STATIONS | DELAY |
|---|---|
| $0 \leq x < 1$ | 0.0 SEC. |
| $1 \leq x < 4$ | 0.1 SEC. |
| $4 \leq x < 9$ | 0.2 SEC. |
| $9 \leq x < 20$ | 0.3 SEC. |
| $20 \leq x < 44$ | 0.4 SEC. |
| $44 \leq x < 95$ | 0.5 SEC. |
| $95 \leq x < 204$ | 0.6 SEC. |
| $204 \leq x < 437$ | 0.7 SEC. |
| $437 \leq x < 935$ | 0.8 SEC. |
| $935 \leq n < 2000$ | 0.9 SEC. |

AUTO ADAPTIVE LOAD BALANCING IN A CONNECTION ORIENTED DATA TRANSMISSION SYSTEM

TECHNICAL FIELD

The present invention relates generally to transmission of data between active work stations and a host over token ring or frame relay networks and more particularly to an auto-adaptive method and system for load balancing in a connection oriented data transmission system.

BACKGROUND

On local Area Networks (LAN's) such as token ring or simulated LAN using Frame Relay, access to a host is defined by a unique media access control (MAC) address. In those cases where several LANs connected by Bridges form a network, the same address can also be propagated on two or more LANs. Ideally, this should result in statistical load balancing by spreading the LAN traffic across the multiple duplicate MAC address.

However, a distribution disparity occurs for incoming calls from active work stations where the majority of the connections are established through one particular MAC address with respect to other duplicate MAC addresses in the network. The disparity is the result of both the operational nature of a bridged Token Ring environment or Frame Relay Switch and the stations. When an active work station wants to connect to a specific MAC address, it broadcasts a route discovery frame (which can be a Test Resolve Command frame or XID 802.2 command frame) to determine a path through the Token Ring or Frame Relay network to any communication controller (or front-end processor) having that MAC address. But depending upon the network configuration, it is possible that one of several communication controllers using the same MAC address will receive discovery frames sooner than the other communication controllers using the same address and answers systematically first. Because the active work stations normally use the route specified in the first response received, most of the connections will be established with that communication controller thereby causing a potential load balancing problem once the session data begins to flow.

A solution consists in monitoring the number of stations that are connected to the host through a communication controller. Based upon the number of supported connections, this communication controller will increase the time needed for additional connections to be established by delaying the response frame to a previously received discovery frame. Delaying the response for some time period allows the incoming call requests to be established through an alternate duplicate MAC address which results in a better call distribution or load balancing.

However, as will be described below in reference to FIGS. 2A and 2B, the amount of response delay time is a parameter depending upon the maximum number of active stations. Such a maximum number being variable, it is necessary for the user to define this parameter empirically in accordance with an estimate of this maximum number.

SUMMARY OF THE INVENTION

The invention contemplates a method and system for dynamically setting an optimum value for the response delay without requesting any parameter from the user.

The invention is particularly suited for use in a communications network for connecting a plurality of work stations to a host system via a plurality of front end communication controllers sharing the MAC address of the host system. In order to connect to the host, active work stations transmit route discovery frames to the host MAC address. These frames are received by all of the front end communication controllers at different times depending on the number of nodes in and the length of the paths they travel. In order to balance the load amongst the front end communication controllers, each calculates and introduces a delay time for issuing a response frame which is a logarithmic function of the current number of active work stations connected to the front end communications controller.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
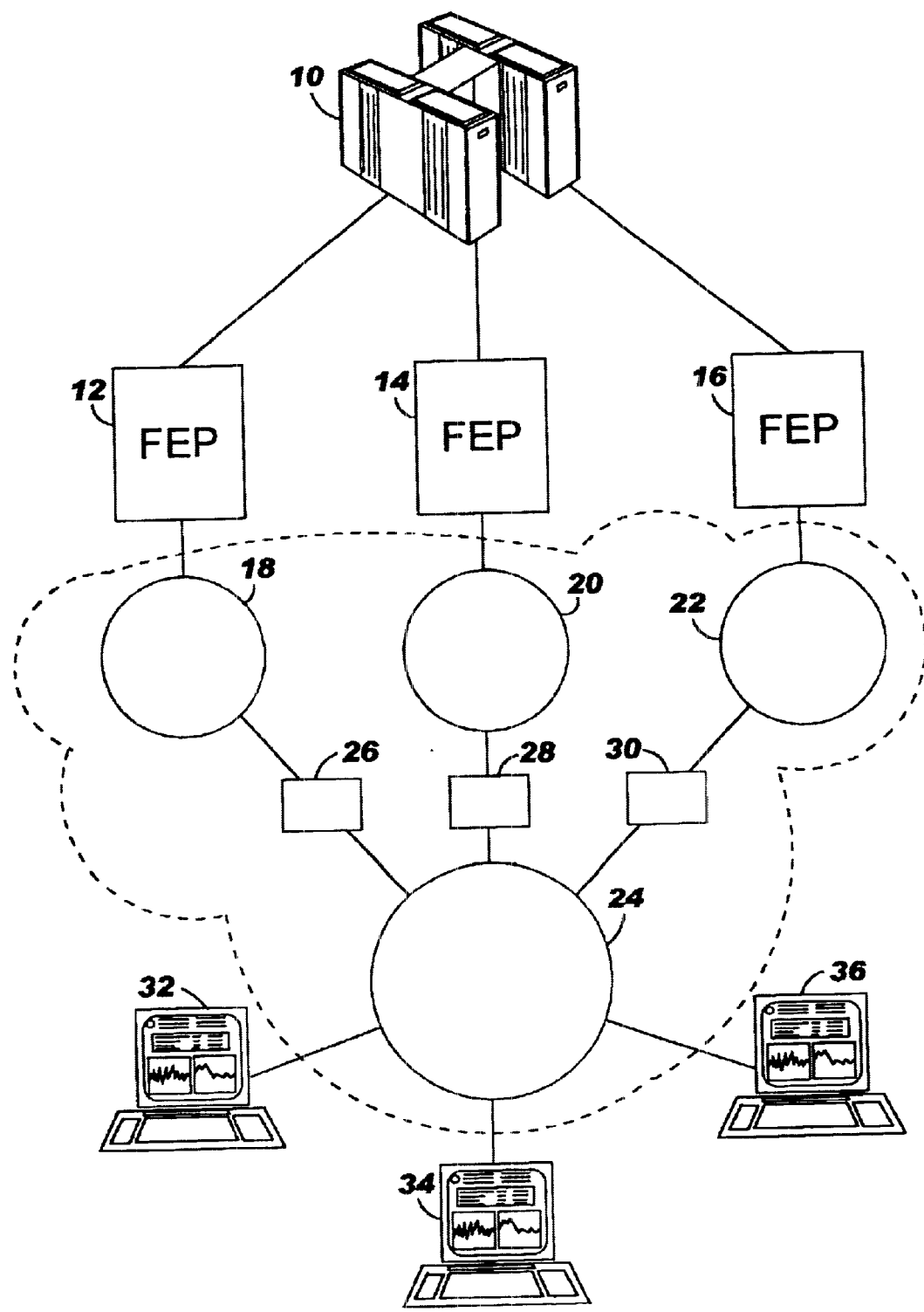
FIG. 1 represents a block-diagram of a data transmission system wherein a number of working stations get access to a host by using the method according to the invention.

As illustrated in FIG. 1, a data transmission system wherein the method according to the invention can be implemented comprises a host 10 which activates a set of three communication controllers or front-end processors (FEP) 12, 14 and 16 using a unique MAC address. Each FEP 12, 14 and 16 is linked to a token ring, respectively the token rings 18, 20 and 22, which are connected to a token ring 24 by respective bridges 26, 28 and 30. Several token ring work stations 32, 34 and 36 are connected to token ring 24 and are able to exchange data with host 10.

Assuming workstation 32 wants to communicate data to host 10, it requests access by broadcasting a route discovery frame using the unique MAC address as destination address. Since this frame is sent in All Route Broadcast Mode, it is copied on token ring 18 by bridge 26, on token ring 20 by bridge 28 and on token ring 22 by bridge 30. As a consequence, the three FEPs 12, 14 and 16 receive a copy of the route discovery frame. When a FEP receives such a frame, it checks whether a host is connected to its adapter and prepares a response frame to send back to the source station which includes the routing information that connects station 32 to host 10 via its adapter. Then, it is normally the route defined in the first response frame received by the work station which is selected.

Figure 2A:
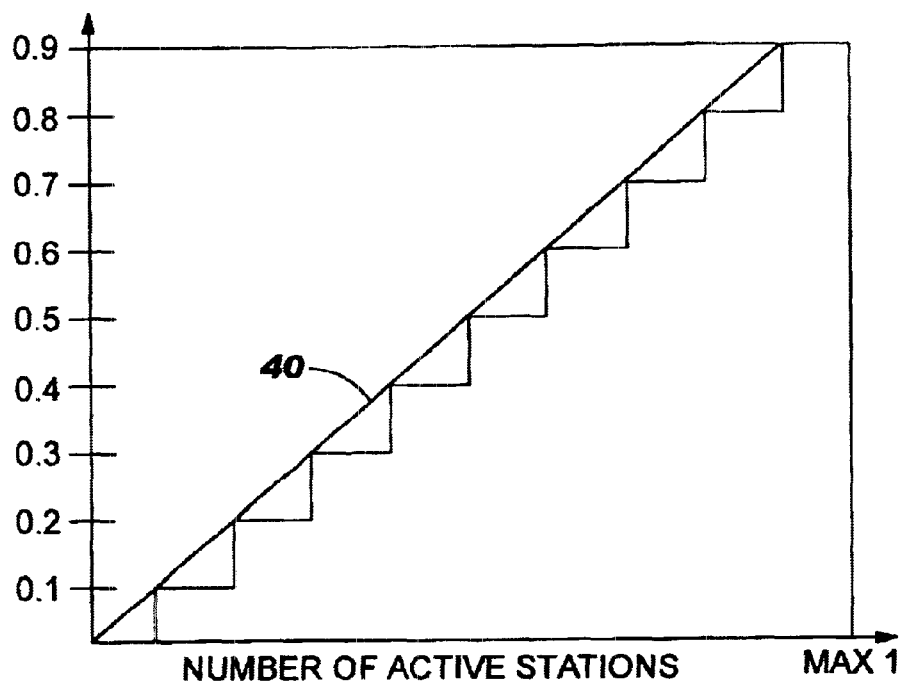
FIG. 2A and FIG. 2B are diagrams representing delay values of the response frame with respect to the number of active stations in the prior art technique, with two different maximum number of stations.

To avoid the situation wherein a communication controller always received a route discovery frame sooner than the other communication controllers and answers systematically first, the solution consists in delaying the response frame sent by a communication controller as a function of the number of the connections to the active stations already established with that communication controller. As illustrated in FIG. 2A, the delay can vary from 0.1 s to 0.9 s by steps according to a straight line 40, the slope of which depends upon the maximum number MAX 1 of active stations. The reason of such steps is that, even in the absence of network congestion, the difference between two propagation delays could reach up to 0.1 s. Therefore, in order to avoid this random effect of the propagation delay, the load balancing retention delay must be computed as a multiple of 0.1 s.

Figure 2B:
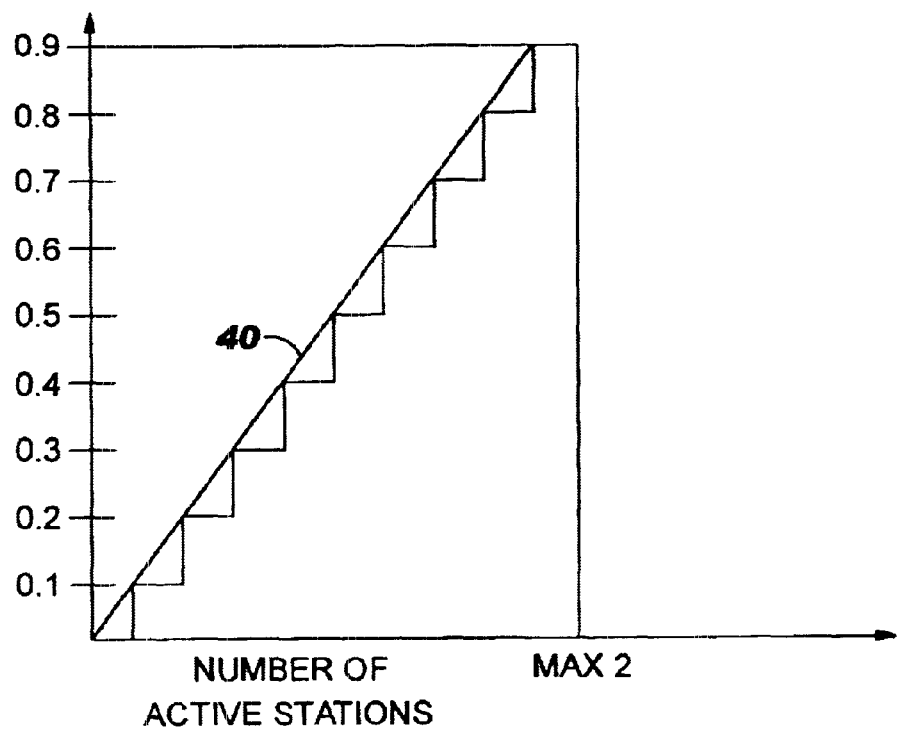

Assuming that the maximum number of active stations which can be connected to the network changes during time from MAX 1 to MAX 2, it is clear that the slope of straight line 40 has to be modified as illustrated in FIG. 2B. Such a modification can be made only by the user and is only based upon an estimated maximum number of active stations at a given time. Therefore, the delay to be applied can never be optimized.

The invention described in this application overcomes the problems described above with respect to the prior art solution. This is accomplished by maintaining a constant ratio between the weight allocated to a new station and the number of current active stations. In other words, the weight of each new active station in the case of a small number of active stations is larger than in case where a larger number of active stations are present. Mathematically, this means that, if n is the number of active stations for the communication controller being considered, the variation $\Delta D$ of delay D is linked to the variation $\Delta n$ of the number of active stations by the following relation:

$$\frac{\Delta n}{\Delta D} = k.n$$

that is also:

$$\Delta D = \frac{1}{k} \cdot \frac{\Delta n}{n}$$

The integration of this relation gives:

$$D = \frac{1}{k} \text{Log}(n + \lambda)$$

For: n=0, the value of D is 0. This means that:

0=Log $\lambda$ $\lambda$=1

Assuming that the total number of stations which can have access to the host is TOTAL and that the maximum delay which would be reached in such a case would be 1 second, we have:

$$1 = \frac{1}{k} \cdot \text{Log}(TOTAL + 1)$$

That is:

$$\frac{1}{k} = \frac{1}{\text{Log}(TOTAL + 1)}$$

In conclusion, the auto-adaptive curve representing the delay versus the number of active stations is:

$$D = \frac{\text{Log}(n + 1)}{\text{Log}(TOTAL + 1)}$$

Figures 3, 4:
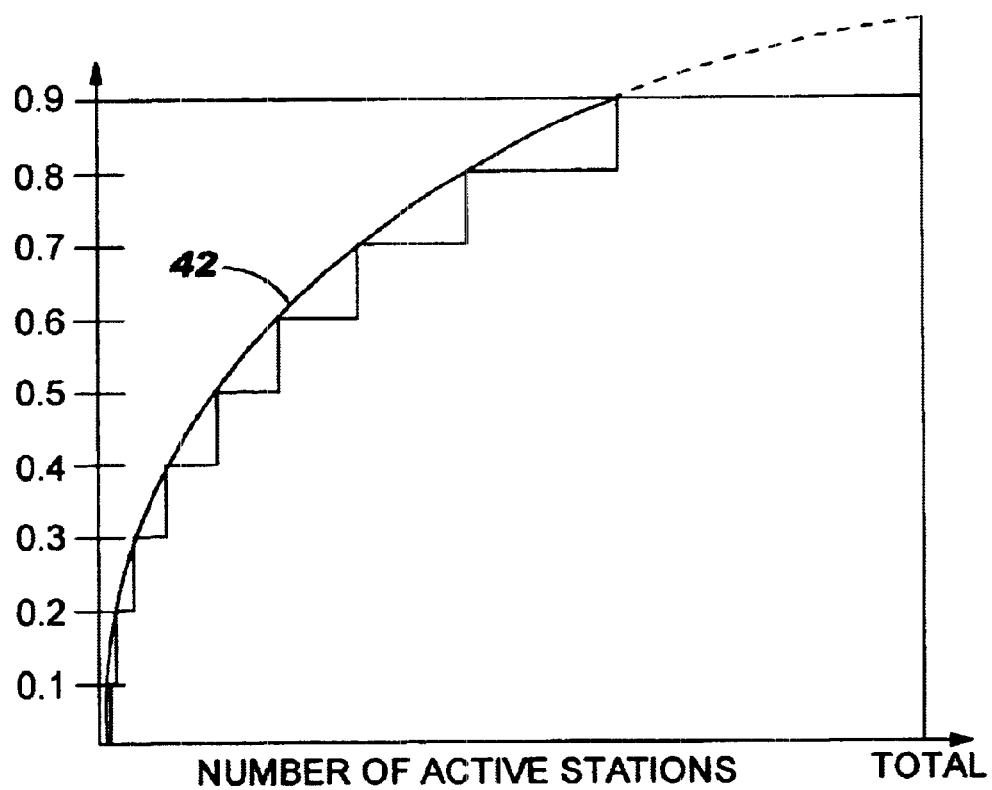
FIG. 3 is a diagram representing the delay value of the response frame with respect to the number of active stations when the method according to the invention is used.
FIG. 4 is a table giving the response delay of an increasing range of the number of active stations resulting from the diagram of FIG. 3.

This curve 42 is illustrated in FIG. 3. Since it is the known total number of stations which is selected as threshold and not the estimated maximum number of stations at a given time, the load balancing is directly adjusted with the current number of active stations.

As the steps of delaying a response are multiples of 0.1 s, it is clear that, as the number of active stations is increased, more and more new active stations are necessary for each increasing delay step as illustrated in the table of FIG. 4. Furthermore, it can be seen that with such a logarithmic curve, the maximum number of active stations comprised generally between 1000 and 2000 in the present example, corresponds to the total number of stations and that the curve is always valid even if the maximum number of active stations changes with time.

What is claimed is:

1. In a communications network for connecting a plurality of work stations to a host system via a plurality of front end communication controllers sharing the MAC address of the host system in response to route discovery messages transmitted to the shared MAC address by the stations to initiate a connection, a auto adaptive method for balancing the load at the front end communications controllers comprising:

at each said front end communication controller maintaining a count of the number of active stations connected to the front end communication controller;

upon receipt of a route discovery message from a station desiring to be connected to the host, generating a delay period which is a logarithmic function of the number of active stations connected through the front end communication controller; and transmitting a response frame including the route to said station at the expiration the generated delay period.

2. The auto adaptive load balancing method set forth in claim 1 in which the delay is selected as a step which is a multiple of 0.1 s ranging from 0.1 s to 0.9 s and is determined by a logarithmic function of the current number of active stations served by the front end communication controller.

3. The auto adaptive load balancing method set forth in claim 2 in which the logarithmic function is given by:

$$D = \frac{\text{Log}(n + 1)}{\text{Log}(TOTAL + 1)}$$

wherein D is said delay to be applied, n is the current number of active stations (32, 34, 36) and TOTAL is the total number of stations which could be connected to said host (10).

4. The auto adaptive load balancing method according to claim 1 or 2, wherein said connection oriented network comprises token rings (18, 20, 22 and 24) which are linked by means of bridges (26, 28, 30).

5. The auto adaptive load balancing method according to claim 1 or 2, wherein said connection oriented network comprises Frame Relay devices.

* * * * *